Oct. 23, 1962
C. W. VOGT
3,059,275
METHOD AND APPARATUS FOR MAKING SELF-SUSTAINING
PELLETS OF PLASTIC MATERIALS
Filed April 27, 1959
3 Sheets-Sheet 1
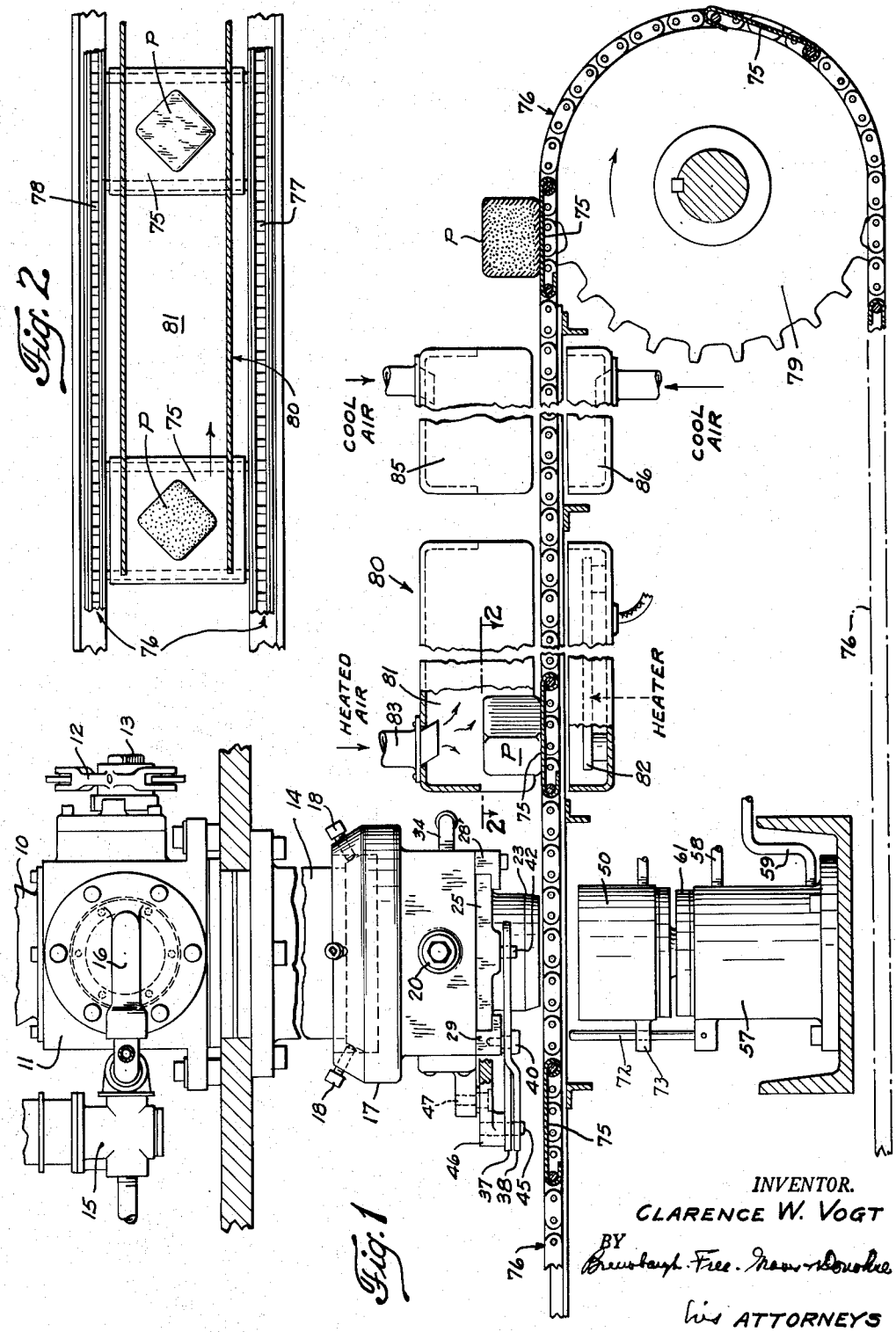
INVENTOR.
CLARENCE W. VOGT Oct. 23, 1962
C. W. VOGT
3,059,275
METHOD AND APPARATUS FOR MAKING SELF-SUSTAINING
PELLETS OF PLASTIC MATERIALS
Filed April 27, 1959
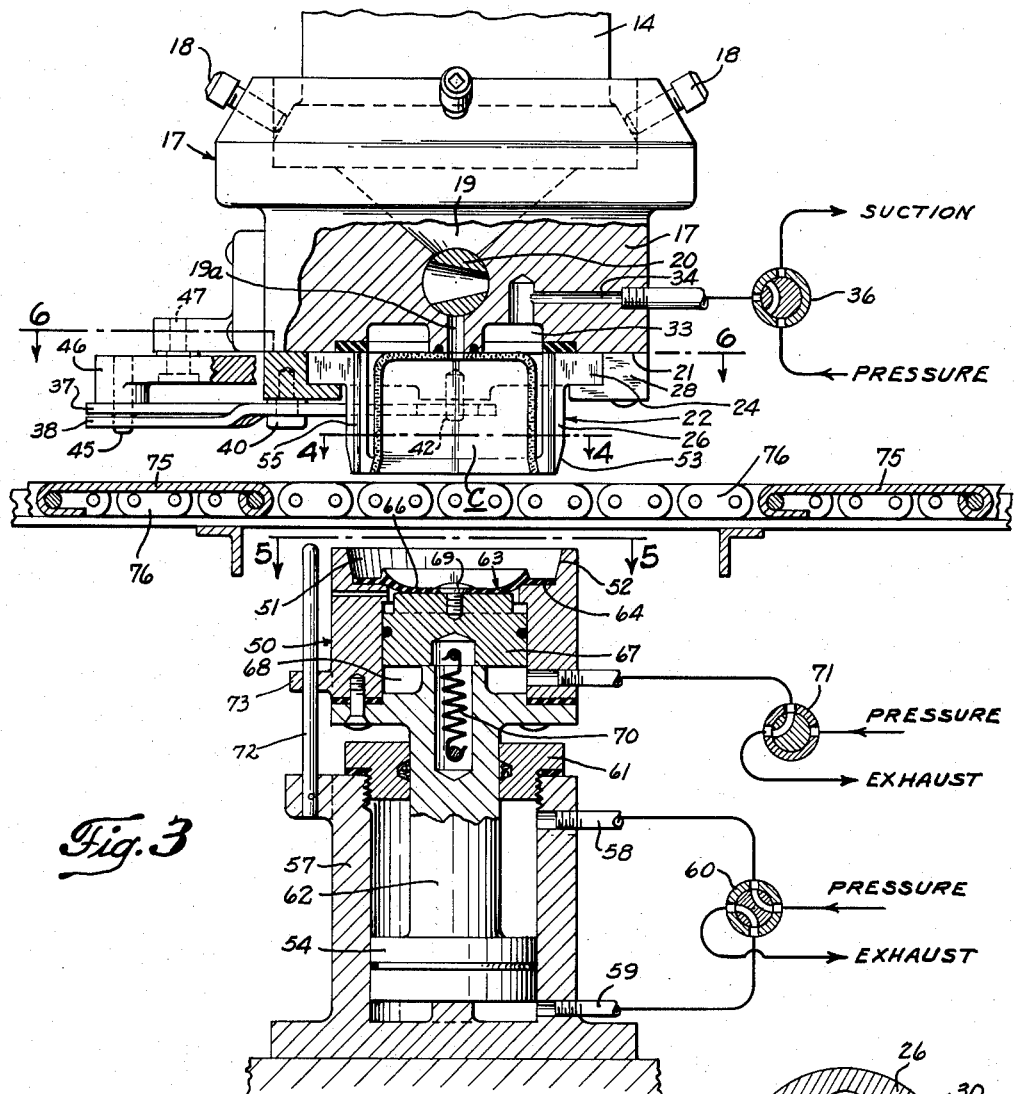
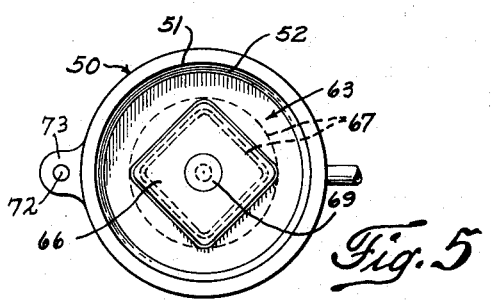
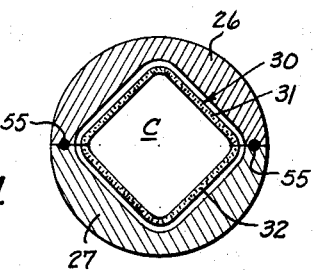
INVENTOR.
CLARENCE W. VOGT
BY
his ATTORNEYS.

Oct. 23, 1962 C. W. VOGT 3,059,275
METHOD AND APPARATUS FOR MAKING SELF-SUSTAINING
PELLETS OF PLASTIC MATERIALS
Filed April 27, 1959 3 Sheets-Sheet 3
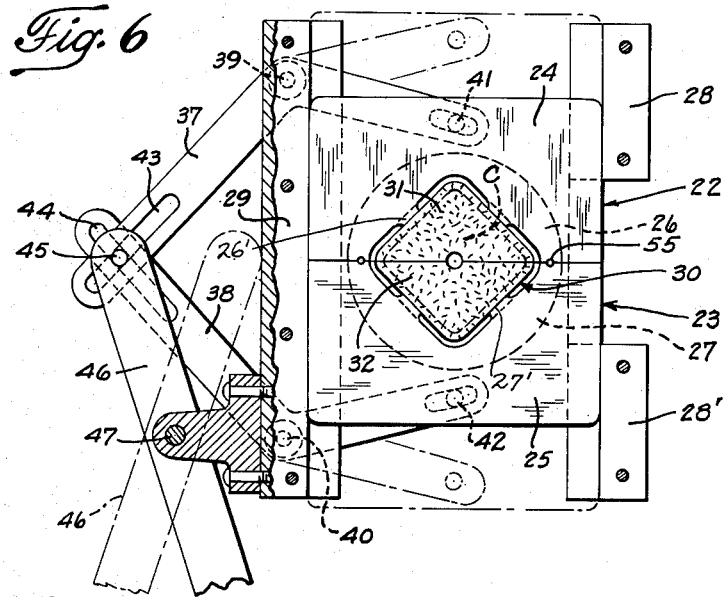
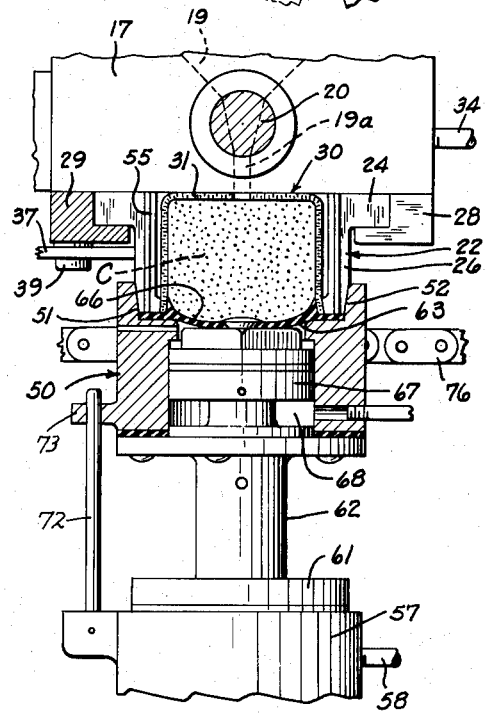
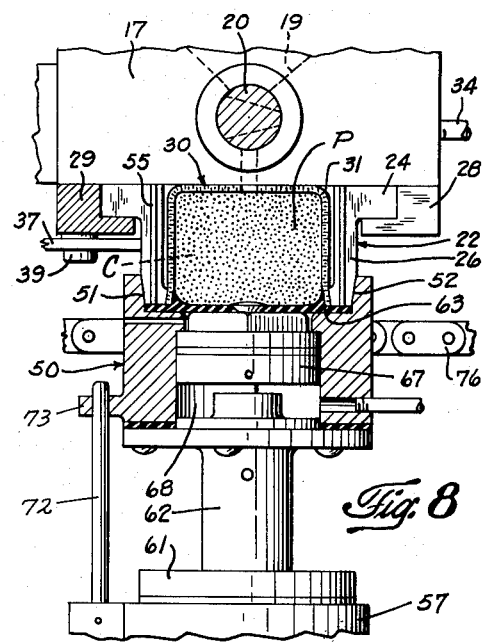
INVENTOR.
CLARENCE W. VOGT
BY
Brumbaugh, Free, Graves & Donohue
his ATTORNEYS.

United States Patent Office 3,059,275
Patented Oct. 23, 1962

3,059,275
METHOD AND APPARATUS FOR MAKING SELF-SUSTAINING PELLETS OF PLASTIC MATERIALS
Clarence W. Vogt, Kettlecreek Road, Weston, Conn.
Filed Apr. 27, 1959, Ser. No. 809,046
5 Claims. (Cl. 18—4)

This invention relates to methods and apparatuses for forming pellets, briquettes, and the like from finely divided materials and it relates particularly to the formation of pellets or briquettes from compositions containing thermo-responsive resins to facilitate the packaging, transportation and charging of the compositions to transfer and compression molding apparatus and other plastic molding apparatus.

Heretofore, thermo-setting resins, such as, for example, phenol-formaldehyde resin, urea-formaldehyde resin and some of the thermo-plastic resins have been packed and sold in a finely divided state, alone or in admixture with filler materials such as wood flour or alpha-cellulose or mineral or organic fibers. These materials are packed and are shipped to the plastic molder in large metal or paperboard drums.

In the case of melamine-formaldehyde and urea-formaldehyde molding compounds, the finely divided powder is sold at a substantially lower price than the granular material, since this represents one step less in their manufacture, namely, the sheeting or briquetting and the subsequent breaking into granular form by hammer milling.

Charging apparatuses for plastic molding devices are not designed to handle the finely divided material and because of the unavoidable variation in the density of the composition due to agitation and impact on the material during handling, it has been customary for manufacturers of molded plastic articles to procure or form the finely divided material into pellets, blocks or briquettes, hereinafter referred to generally as pellets, to facilitate charging of the molding apparatus.

A major disadvantage of pelletizing these finely divided compositions has been the inability of the presently used apparatus to remove air during the compression of the pellets. Presence of air often causes striations of the pellets with subsequent loss of strength and handleability. Moreover, striations or air pockets frequently cause uneven heating during the dielectric or electronic radio frequency pre-heating of pellets.

More particularly in accordance with the present invention, a finely divided molding composition is charged into cavities by applying fluid pressure to a body of the finely divided composition to force the particles through an aperture into the cavity while simultaneously venting fluid from the cavities and retaining the finely divided material in the cavity to fill it. Thereafter, the material in the cavity may be squeezed or mechanically compressed to increase its density and to form a pellet which is at least partially self-sustaining so that it can be transferred from the cavity and subjected to further treatment to render it sufficiently self-sustaining to enable subsequent handling without substantial breakage. The preferred further treatment involves passing the pellet through a heating zone where the surface layer of the pellet is heated, the resin particles therein are somewhat softened and are sintered or adhered together to form a thin coating or shell on the exterior of the pellet. Heating should be controlled so that it does not raise the temperature of the pellets sufficiently to cause thermo-setting resins to set, nor should it cause thermoplastic resins to flow. After the formation of the surface film thereon, the pellet is cooled to harden the surface layer and form a self-supporting shell enclosing the other particles which are in an unbonded state. Due to the density of the material and the strength of the surface layer on the pellet, it is more resistant to impact. For that reason, pellets produced in accordance with the invention may be readily packed in drums or other containers or charged into a preheater for transfer or compression molding without further treatment or into the hopper of an injection molding apparatus, for example, for conversion into a molded product.

For a better understanding of the present invention reference may be had to the accompanying drawing in which:

FIGURE 1 is a view partially in side elevation, partially in vertical section and partially broken away of an apparatus for forming pellets, briquettes and the like in accordance with the present invention;

FIGURE 2 is a plan view of a portion of the conveyor of the apparatus taken on line 2—2 of FIGURE 1 of the drawing;

FIGURE 3 is a view partially in side elevation, partially in vertical section and partially broken away disclosing details of the compressing mechanism of the apparatus;

FIGURE 4 is a view in section taken on line 4—4 of FIGURE 3;

FIGURE 5 is a view in section taken on line 5—5 of FIGURE 3;

FIGURE 6 is a view in section taken on line 6—6 of FIGURE 3; and

FIGURES 7 and 8 are views partially in vertical section and partially in side elevation of the apparatus, illustrating its action in compressing a charge of finely divided material in the forming cavity of the apparatus.

The form of apparatus chosen for purposes of illustration is in some respects similar to the apparatus disclosed in my U.S. Patent No. 2,879,809 granted March 31, 1959. It includes a hopper 10 for receiving a composition to be formed into pellets, such as for example, a mixture of granular or finely divided and incompletely condensed phenol-formaldehyde resin in admixture with sawdust, vegetable or inorganic fibers or the like. The hopper 10 communicates with the interior of a valve casing 11 which contains a rotary valve (not shown) rotatable by means of a rocker 12 on a shaft 13 to one position in which the composition can flow from the hopper 10 into a magazine 14 below the valve casing 11 and to another position in which flow from the hopper 10 into the magazine 14 is prevented. Also connected with the valve casing 11 is a solenoid valve 15 by means of which air or other gaseous fluid under pressure can be admitted through the connections 16 into the interior of the casing 11 to apply gas pressure to the surface of the material in the magazine 14 to force it through a discharge member 17 which is supported on the lower end of the magazine 14 by means of set screws 18 or the like. The air or gas is admitted while the hopper 10 is out of communication with the hopper. Gas is vented from the casing 11 through the solenoid valve 15 to enable the magazine 14 to be recharged from the hopper 10.

A downwardly converging passage 19 is formed in the discharge member 17 which communicates with a more restricted passage 19a on the opposite side of a rotary valve member 20 by means of which flow of the material from the magazine through the passages 19 and 19a can be interrupted. The above described apparatus is disclosed in my above identified patent.

The new apparatus in accordance with the invention differs from my prior apparatus in the following particulars.

Mounted on the under surface 21 of the discharge nozzle 17 are a pair of mold cavity sections 22 and 23 which are best shown in FIGURE 6. The mold sections 22 and 23 include plates 24 and 25 which are provided with downwardly extending sleeve portions 26 and 27. The outer surfaces of the sleeves are semicylindrical and can be brought together to form a cylindrical shell by sliding the plates 24 and 25 in the guide ways 28, 28' and 29 which comprise undercut rabbeted bars fastened to the surface 21 of the discharge member 17. Each of the sleeves 26 and 27 has an internal recess of prism-like cross-section for receiving a correspondingly shaped section of a shell 30 formed of porous filtering material, such as for example, porous sintered metal, which forms the top and four sides of a generally cube shaped cavity C. The shell 30 is divided diagonally to form the shell sections 31 and 32. The shell sections have their lower ends secured as by brazing to the lower ends of the sleeves 26 and 27 but their outer surfaces are completely or principally spaced from the sleeves to provide air flow passages. If necessary, the shell sections 31' and 32 may be reinforced or supported against flexing under internal pressure by means of ribs or bosses 26' and 27' (FIG. 6) on the shells 26 and 27. A recess or recesses 33 formed in the under surface 21 of the discharge member 17 generally concentric with or circumferentially disposed with respect to the discharge passage 19a communicate with the passages behind the shell sections when the shell 30 is closed. The recess 33 communicates with a passage 34 which may be provided with a valve 36 by means of which the space around the shell 30 can be connected to atmosphere, suction or a source of gas or air pressure as desired. Referring to FIGURE 6, it will be apparent that the two sections 31 and 32 of the shell 30 including the slide plates 24 and 25 are intended to be moved together to form the mold cavity C which is closed except at the bottom, or to be moved apart a substantial distance. To that end, the apparatus is provided with a pair of cranks 37 and 38 which are mounted on pivots 39 and 40 on the guide bar 29. One end of the lever 37 is connected by means of a sliding pivot 41 to the slide plate 24 and one end of the lever 38 is connected by a similar sliding pivot 42 to the slide plate 25. The opposite ends of the levers 37 and 38 are also provided with slots 43 and 44 which slidably receive an actuating pin 45 on one end of an actuating lever 46 which, by rocking movement around a supporting pivot 47 on the discharge member 17, can rock the levers 37 and 38 clockwise and counterclockwise to move the mold shell sections 31 and 32 together in the position shown in FIGURES 4 and 6 or apart to the dotted line position shown in FIGURE 6.

In order to confine the material discharged through the passage 19 into the cavity C formed by the shell 30, a bottom closure is provided. As best shown in FIGURES 3, 7 and 8, the bottom closure includes a cup-shaped member 50 having a recess 51 in its upper end which is provided with inclined annular peripheral wall 52 cooperating with inclined surfaces 53 on the lower end of the shell portions 26 and 27. When the member 50 is raised by means of fluid pressure acting on the piston 54 on which the member 50 is supported, the inclined surfaces 52 and 53 cooperate to wedge or squeeze the sleeve portions 26 and 27 into tightly fitting engagement. A leak-tight seal is obtained by providing one or both of the sleeve sections 26 and 27 with resilient sealing strips 55 which seat in grooves in the opposed sleeve members. The piston 54 which supports the closure member 50 is mounted in a cylinder 57 and is raised or lowered by means of fluid under pressure introduced into the bottom or top of the cylinder 57 through the conduits 58 and 59 which are connected to and controlled by a rotary selector valve 60 of known type. A cylinder head 61 is mounted on the upper end of the cylinder and receives slidably the piston rod 62 on the piston 54.

The bottom of the cavity formed by the mold shell is sealed by means of a flexible rubber liner 63 having a thin peripheral edge cemented or otherwise secured to an annular shoulder 64 adjacent the inclined rim 52 of the recess 51. The liner 63 has a raised lip of generally square outline adapted to engage in the lower end of the shell 30 and a concavely curved mid-portion 66 which is secured to a piston 67 slidably mounted in a recess 68 in the member 50 by means of a screw 69 or the like. A spring 70 having its opposite ends connected to the piston 67 and the piston rod 62, normally urges the piston downwardly but the piston 67 and the mid-portion of the liner can be raised as shown in FIGURE 8 by introducing fluid under pressure into the cylinder space 68 in the member 50 below or behind the plunger 67 by means of the control valve 71. Thus, it will be apparent that by suitably manipulating the valve 60, the mold bottom member 50 may be raised to engage the lower ends of the shell sections 26 and 27 to therewith form a closed cavity C, the major portion of the walls of which are formed of a porous filtering material. The bottom member 50 is guided in its up and down movements by means of a guide rod 72 fixed to the cylinder 57 and an eye 73 on the member 50 which slidably receives the rod 72. When a finely divided resin-containing composition is blown from the magazine 14 through the open valve 20 and the discharge passages 19, 19a into the closed cavity, air in the cavity and in the composition can escape through the porous shell 30, recess 33, the passage 34 and the valve 36 to enable the cavity to be filled with the compacted composition. When the cavity C is filled and flow of the composition stops, the valve 20 is closed and gas is vented from the magazine 14 to enable it to be charged from the hopper 10. At about the same time, gas is introduced through the valve 71 into the cylinder space 68 to force the piston 67 upwardly to the position shown in FIGURE 8 whereby the material is squeezed or is compacted to render it more dense. At the same time, a reduced pressure or suction may be applied through the valve 36 and the passage 34 to aid in removal of interstitial air from the pellet. Thereafter, the mold bottom member 50 is retracted and the compacted pellet P is discharged onto one of the receiving plates 75 on the chain conveyor 76 which is adjacent to the lower ends of the shell sections 26 and 27. As shown in FIGURES 1, 2 and 3, the conveyor 76 includes a pair of spaced apart endless link chains 77 and 78 supported by pairs of sprockets 79 at each end which carry the receiving plates 75 in spaced relation such that the filling operation can be accomplished in the interval between the movement of successive plates 75 beneath the discharge member. The conveyor 76 can be moved continuously or intermittently as desired. Thus, when the mold bottom 50 is retracted by introducing fluid through the valve 60 into the upper part of cylinder 57, one of the receiving plates 75 is moved beneath the mold cavity shell 30. Operation of the lever 46 (FIGURE 6) separates the mold cavity members 22 and 23 so that the compacted pellet P is dropped on one of the mold plates 75 and is carried away for further treatment. Separation of the pellet from the shell 30 may be facilitated by introducing fluid under pressure into the space between the sleeves 26 and 27 and the shell sections 31 and 32.

Further treatment of the pellet P includes passing it through a heating device 80 including, for example, a tunnel 81 above the conveyor and a heating plate 82 below the conveyor to enable all surfaces of the generally prism-like pellets to be heated to about the same temperature. In the form of the invention illustrated, the upper and side surfaces of the pellet P are heated by means of heated air introduced through the pipe 83. The bottom surface is heated by means of the electric heater 82. Other types of heating elements, such as, radiant heaters, gas heaters or the like may be used if desired.

The surfaces of the pellet P should be raised to a temperature sufficiently high to cause a softening of the resin particles in the surface zone of the pellet. Such softening allows the particles to stick together to form a self-sustaining surface layer on the pellet. This surface layer is hardened and rendered resistant to impact by passing the pellet through a cooling tunnel 85 where the pellet is cooled from below and from above by directing cool air through the tunnel 85 and the cooling chamber 86 below the conveyor 75. The pellets are now self-sustaining and can be discharged for further handling such as packing, transporting and the like.

The pellets P illustrated in the drawings are substantially cube-shaped and they may be of any suitable dimensions, for example, an inch square, an inch and a half square or larger or smaller. However, the pellets may be made in other shapes, such as, disc-like, cylindrical, polyhedral or the like. However, for ease of packing and conservation of packing space, the cube-like pellets are preferred.

As indicated above, it is possible to use different types of heating and cooling means for softening and hardening the surface portion of the pellets and other means may be used for giving the pellets a preliminary squeeze prior to discharge from the forming cavity.

Moreover, while the pellet forming apparatus is illustrated as forming single pellets, it will be understood that the molding unit may be provided with a plurality of cavities to enable a plurality of pellets to be formed simultaneously. Accordingly, the form of the invention described herein should be considered as illustrative and not as limiting the scope of the following claims.

I claim:

1. A method of making form-retaining pellets of finely divided compositions containing heat-responsive substances, comprising forcing said composition into a cavity by means of gas under pressure, venting said gas from said cavity simultaneously to fill it with said composition, reducing the capacity of said cavity to compress the composition therein and form a pellet, discharging the pellet from said cavity, heating the surface of the pellet to soften heat-responsive substance therein and at least partially adhere the composition in the surface of said pellet, and cooling the pellet to harden its surface and render it self-sustaining.

2. A method of making form-retaining pellets of finely divided compositions containing heat-responsive synthetic resins, comprising applying gas at super-atmospheric pressure to a fluent mass of said composition to cause part of said mass to flow into a cavity, venting gas from said cavity while retaining said composition therein to fill said cavity, interrupting the flow of composition into said cavity when it is full, compressing the composition in said cavity to render it denser and form a pellet thereof, heating the pellet to soften a thin surface layer of the synthetic resin, and cooling the surface layer to harden it and form a thin self-sustaining surface coating on the pellet to render it self-sustaining.

3. A method of making form-retaining pellets of finely divided compositions containing heat-responsive synthetic resins, comprising applying gas at super-atmospheric pressure to a fluent mass of said composition to cause part of said mass to flow into a cavity, venting gas from said cavity while retaining said composition therein to fill said cavity, interrupting the flow of composition into said cavity when it is full, compressing the composition in said cavity to render it denser and form a pellet thereof, discharging said pellet from said cavity, heating the pellet to soften a thin surface layer of the synthetic resin, and cooling the surface layer to harden it and form a thin self-sustaining surface coating on the pellet to render it self-sustaining.

4. A molding apparatus for forming pellets of finely divided compositions comprising a pair of mold sections, each section having a recess therein, a wall member in each mold section forming about one half of the top and sides of a mold cavity, at least portions of said walls being porous to allow gas to flow therethrough, means for introducing material into the top of said mold cavity, means supporting said mold sections for movement into and out of engagement, a bottom closure for said mold cavity movably mounted below said mold sections, means for moving said bottom closure into engagement with the lower ends of said mold sections to close said mold cavity when said mold sections are in engagement, a member movably mounted in said bottom closure for varying the size of said mold cavity, means for moving said member to reduce the size of said cavity and compress said material therein, means on said bottom closure and said mold sections engageable to urge said mold sections into sealing engagement when mold cavity is closed by said bottom closure, and conveying means below said mold member having spaced-apart plates for receiving compressed material from said mold sections, said conveyor having spaces therein between said plates through which said bottom closure is moved to close and uncover the mold cavity.

5. A molding apparatus for forming pellets of finely divided compositions comprising a hollow mold member having a side wall, a filling opening in its top and an open bottom, at least a part of said side wall being porous to permit gas to flow therethrough, means for introducing material into the top of said mold member, a bottom closure for said mold member movably mounted below said mold member, means for moving said bottom closure into engagement with the lower end of said side wall to close said open bottom, a member movably mounted in said bottom closure for varying the capacity of said mold member, means for moving said member in said bottom closure to reduce the capacity of said mold member and compress the material therein, and conveying means below said mold member having spaced apart plates for receiving compressed material from said mold member, said conveyor having spaces therein between said plates through which said bottom closure is moved to close and uncover said open bottom.

References Cited in the file of this patent

UNITED STATES PATENTS

| | | |
|---|---|---|
| 1,268,842 | Hickey | June 11, 1918 |
| 1,835,914 | Stockdale | Dec. 8, 1931 |
| 2,026,940 | Hendryx | Jan. 7, 1936 |
| 2,347,971 | Sayre | May 2, 1944 |
| 2,348,197 | Ernst et al. | May 9, 1944 |
| 2,427,044 | Burns | Sept. 9, 1947 |
| 2,468,672 | Judell | Apr. 26, 1949 |
| 2,563,643 | De Ranek | Aug. 7, 1951 |
| 2,614,945 | Krisam | Oct. 21, 1952 |
| 2,714,076 | Seckel | July 26, 1955 |
| 2,770,025 | Mollers | Nov. 13, 1956 |
| 2,851,725 | Bauer | Sept. 16, 1958 |